April 28, 1942.　　　　A. LYSHOLM　　　　2,280,835
AIRCRAFT
Filed April 20, 1937　　　2 Sheets-Sheet 1
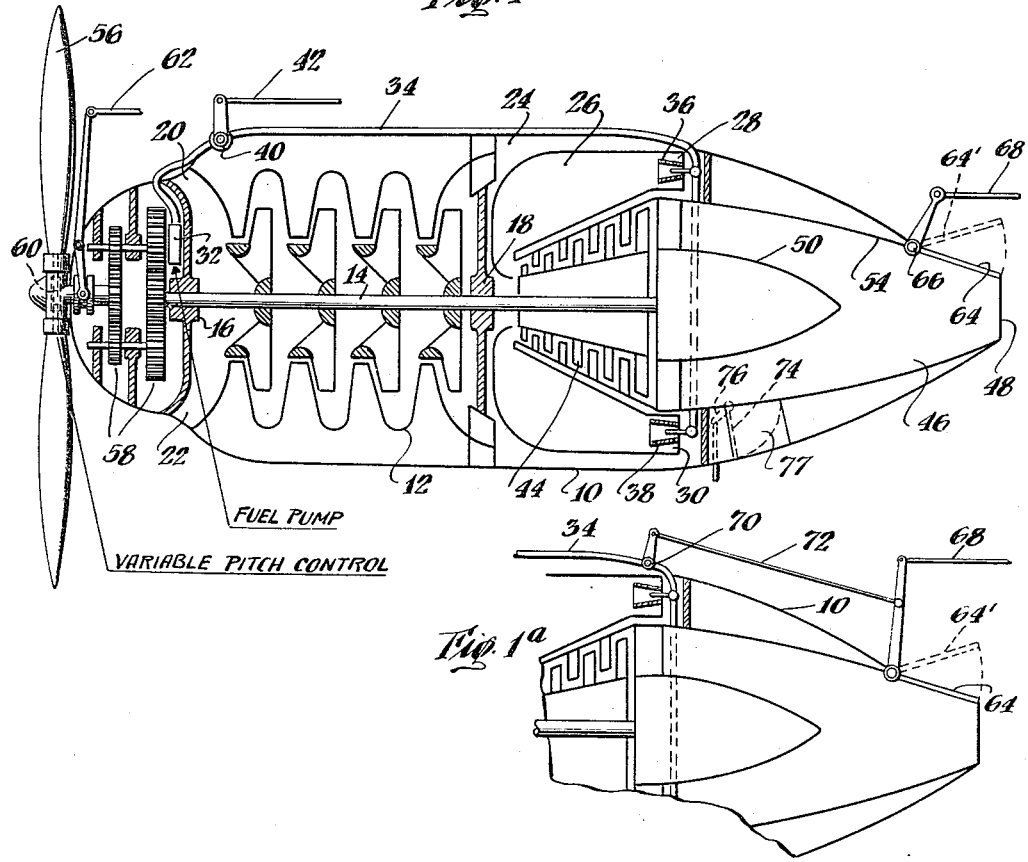
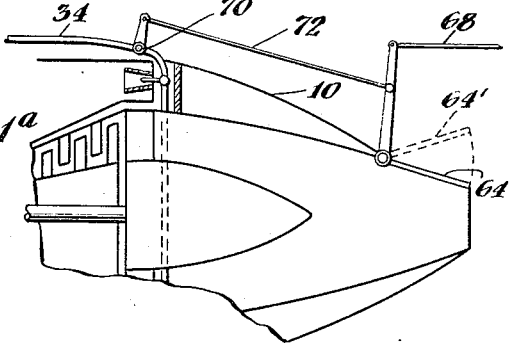
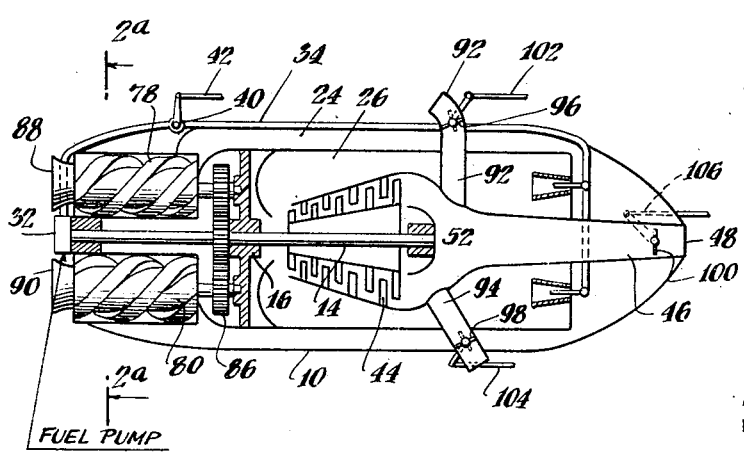
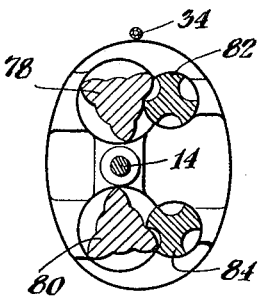
INVENTOR
Alf Lysholm
BY
ATTORNEY

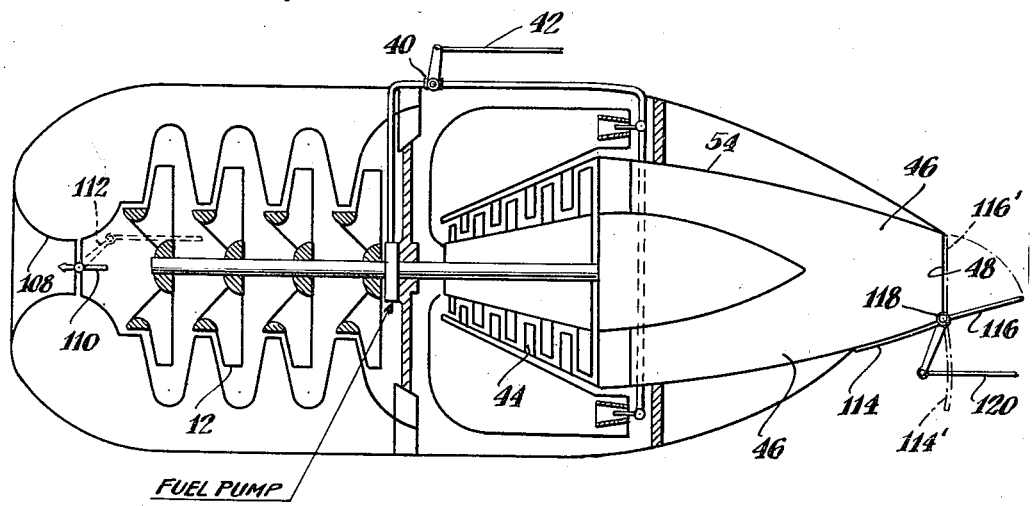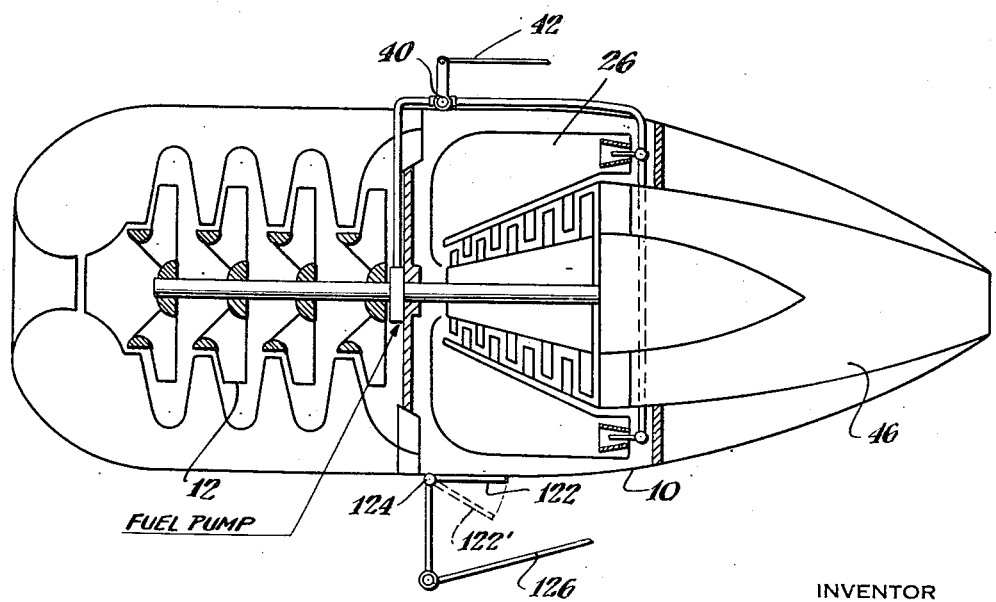

Patented Apr. 28, 1942

2,280,835

UNITED STATES PATENT OFFICE 2,280,835

AIRCRAFT

Alf Lysholm, Stockholm, Sweden, assignor, by mesne assignments, to Jarvis C. Marble, Leslie M. Merrill, and Percy H. Batten, as trustees Application April 20, 1937, Serial No. 137,969
In Great Britain April 21, 1936

12 Claims. (Cl. 60—35.6)

The present invention relates to aircraft and has particular reference to aircraft propelled by gas turbine systems. Still more particularly, the invention relates to aircraft propelled by gas turbine systems of the continuous combustion type.

The primary object of the invention contemplates the provision of novel method and means whereby the power output of a gas turbine system available for propulsion of the aircraft may be increased in the shortest possible time. Rapid increase in the power available for propulsion is of great importance not only for starting purposes, but also during the landing period if the pilot misjudges the distance to the landing place or has to avoid an obstacle not previously noticed, in which instances a steep climb is generally required.

The type of propulsion unit to which the invention relates is of known form constituting turbine means adapted to be driven by compressed and heated motive fluid compressed by compressor means driven by the turbine means and heated in combustion chamber means, usually by direct combustion of fuel in the compressed medium. A system of this character may comprise one or a plurality of turbines, compressors, and combustion chambers and the total power developed by the turbine means is usually controlled by varying the quantity of fuel supplied to the combustion chamber means. Of the total power developed by the turbine means, a certain amount is required for driving the compressor means, the balance being available for propulsion purposes.

As will hereinafter more fully appear, the present invention contemplates in such a system the provision of means for varying at will the ratio of the power input to the compressor means to the power available for propulsion purposes, in order to secure the desired objects of the invention.

Ordinarily, in a system of the character under discussion, the power developed by the system is increased by supplying additional fuel to the combustion chamber, and vice versa. If, however, it should become necessary or desirable to rapidly accelerate an aircraft from a relatively low velocity of flight, the sudden and considerable increase in the amount of fuel supplied, if the ordinary procedure were followed, would cause the initial temperature of the motive fluid to exceed safe values, since the speed and capacity of the compressor means would not ordinarily increase so rapidly that the quantity of compressed air delivered to the combustion chamber means would correspond momentarily to the substantially increased fuel supply. Furthermore, in such a case a certain time is required to obtain full power of the unit.

In accordance with the present invention this difficulty is avoided and instantaneous full load secured by altering the ratio of power delivered to the compressor means to the power utilized for propulsion. Preferably the speed of the unit under these conditions should be very high, in order to avoid waste of time for acceleration of the compressor and turbine means. Furthermore, waste of fuel required by the unit during the short time stand-by conditions prevail is of no importance. Thus, regulating means may be used which otherwise would not be suitable for economical part load, such as keeping the fuel supply constant and wasting the useful propulsive energy by discharging or by-passing part or all of the motive fluid, in order to decrease the useful heat drop. It is preferable, however, to decrease the fuel supply when running under stand-by conditions. Preferably, the power input to the compressor means is temporarily increased by the change in power ratio and the power available for propulsion simultaneously decreased, such decrease in propulsion power, however, being only temporary.

By increasing the power input to the compressor means at the expense of propulsion power, the quantity of compressed air produced by the compressor means may be very rapidly increased. This increase in air quantity, if accomplished prior to the introduction of additional fuel, will result in a temporary decrease in the temperature of the motive fluid, and, after the additional air is obtained due to the increased power input to the compressor means, the fuel supply may then be suddenly increased without resulting in the production of motive fluid temperatures higher than the maximum safe value.

After the fuel supply is increased to a value corresponding to the increased quantity of compressed air, the normal ratio of power input to the compressor means to the propulsion power may be reestablished and acceleration of the aircraft will be obtained to an extent commensurate with the increased fuel and air supplies. By following this procedure, the time required for producing the additional power required to effect the desired acceleration may be made considerably shorter than the time which would be required to obtain the same final result by gradually increasing the fuel supply without making any change in the momentary proportioning of the power employed for driving the compressor means as compared with the power used for propulsion.

If, for example, it is desired to start an aircraft in accordance with the principles of the invention, the power input to the compressor means is increased until the speed thereof has attained the desired value. During this time only a relatively small amount of fuel is supplied to the combustion chamber and the greatest portion of the energy derived from the fuel is absorbed by the compressor means, the means producing the propulsion power for the craft operating at no load or practically no load conditions. If the inlet of the compressor is left fully open during this period, a relatively large amount of air is as a result delivered to the combustion chamber means and the temperature of the motive fluid will be considerably lower than under normal operating conditions. If now the fuel supply is suddenly increased to the value corresponding to the full load operation, and if the means governing the distribution of the power developed by the turbine means are adjusted so that the ratio of power input to the compressor means to the power used for propulsion is given its normal value, a very rapid increase in power available for propulsion, and consequent rapid acceleration, can be obtained.

If acceleration is desired for any reason when landing, the procedure is substantially the same as that above described. If, for example, the system is assumed to be operating at half load, an increase in the power input to the compressor means as compared with the power available for propulsion, will enable the fuel supply to be suddenly increased to the value corresponding to full load conditions. With full load power available and the power distribution ratio adjusted to its normal value, rapid acceleration can then be obtained.

When gas turbine systems are used for aircraft propulsion, the propulsion in some instances may be secured entirely by the rocket effect produced by the exhaust gases from the turbine being discharged rearwardly at high velocity. In a system of this kind, the ratio of the power input to the compressor means to the power available for propulsion may, in accordance with the present invention, be increased by decreasing the back pressure of the exhaust gases delivered from the turbine or, in addition thereto, by decreasing the inlet area of the compressor means, or by discharging a portion of the compressed air or motive fluid through an opening preferably arranged between the compressor means and the combustion chamber means or after the turbine means. In all of these instances, the compressor means will absorb relatively more of the momentary power available than during normal operation.

Decrease of the back pressure of the exhaust gases may advantageously be effected either by increasing the cross-sectional area of the opening through which the exhaust gases leave the craft or by opening one or more by-pass conduits for these gases, such conduits being arranged so that when opened the reactive or rocket effect of the gases is decreased.

In either instance, the back pressure at which the turbine means exhausts and the velocity of the gases discharged will be reduced and this will also reduce the propelling power delivered. Reduction in the back pressure of the exhaust gases results in an increased pressure drop, with consequent increased heat drop, through the turbine means and the turbine will be able to develop more mechanical energy from the motive fluid momentarily supplied. This additional energy is entirely absorbed by the compressor means. If the amount of fuel supplied to the combustion chamber is maintained the same as before the back pressure on the turbine is decreased by increasing the discharge opening for the gases, the speed of the turbine and of the compressor will be increased. If, however, it is desired to maintain the speed of operation of the turbine and compressor constant or substantially constant during the time required for increasing the ratio of power input to the compressor to the power available for propulsion, the fuel supply may be decreased at the same time the back pressure on the turbine is decreased. To this end means may be provided for varying the fuel supply independently of the normal or main control of the fuel supply. Such means should be arranged to decrease the fuel supply if the ratio of power input to the compressor means to the power available for propulsion is to be increased, and to increase the supply of fuel if the normal power ratio is to be reestablished. If the supply of fuel is decreased, the total amount of energy produced by the system will be reduced, but, due to the reduction of the back pressure of the exhaust gases, a relatively greater amount of energy will be converted into mechanical power absorbed by the compressor, as compared with the power available for propulsion, than under normal operating conditions.

As previously pointed out, the ratio of the power input to the compressor means to the power available for propulsion may be increased by throttling the inlet of the compressor means in connection with the reduction of the pressure of the exhaust gases. To this end the compressor inlet may be provided with a throttle valve or the like adapted to control the amount of air drawn in by the compressor. If the quantity of air compressed and the pressure of the exhaust gases are reduced, the quantity of the motive fluid and the velocity of the exhaust gases and the rocket effect produced thereby, will be decreased. The power input to the compressor will likewise be decreased, but to a smaller degree than the rocket effect so that the amount of energy momentarily converted into mechanical power and delivered to the compressor will be relatively greater than the power available for propulsion.

As pointed out above, the ratio of the power input to the compressor means to the power available for propulsion may be increased by discharging a portion of the compressed air through an opening arranged between the compressor means and the combustion chamber means. In this instance, the compressor delivers more compressed air than is used in the combustion chamber and turbine, the surplus being discharged into the atmosphere. If the aircraft is to be accelerated, the discharge opening is closed, and the amount of compressed air previously discharged will then be accessible for burning a materially increased amount of fuel.

The desired effect of increasing the relative power input to the compressor means may also be obtained with a system in which propulsion is effected by one or more air screws driven by the turbine means as well as by the rocket effect of exhaust gases. If it is assumed that the system includes a gas turbine driving both a compressor and a propeller, and with the exhaust gases from the turbine being discharged rearwardly at high velocity, the power for propulsion will consist of the sum of the tractive effort exerted by the propeller and the rocket effect produced by the exhaust gases. If the back pressure of the exhaust gases is reduced from the value corresponding to normal operation, the rocket effect will be reduced and with sufficient pressure reduction may be substantially entirely eliminated. Assuming no change in the fuel supply, the amount of energy lost for the purpose of producing a rocket effect will be delivered to the compressor and to the propeller. Thus, the relative power input to the compressor will be increased and the total power delivered for propulsion will be decreased. If the fuel supply is decreased in order to keep the speed of the turbine constant or substantially constant, the rocket effect, the power input to the compressor, and the tractive effort of the propeller will all accordingly be decreased. By simultaneously decreasing the back pressure and the fuel supply, the ratio of power input to the compressor to the power available for propulsion may thus be increased while maintaining substantially constant speed of the turbine and propeller. As in the examples hereinbefore described, rapid acceleration of the aircraft may thereafter be effected by rapidly increasing the fuel supply.

In addition to decreasing the back pressure of the exhaust gases, the desired effect of increasing the relative amount of the power input to the compressor may be obtained by throttling the inlet of the compressor. In such case the operation of the system will be substantially the same as that previously described with respect to the system in which propulsion is effected by rocket effect only, and the amount of energy corresponding to the decrease in rocket effect will be delivered partly to the compressor and partly to the propeller, thus increasing the relative power input to the compressor as compared to the total power delivered for propulsion.

In a system employing a propeller, the relative amount of power delivered to the compressor may also be increased by decreasing the power absorbed by the propeller. To this end the propeller is advantageously provided with blades adjustable to vary the pitch. By adjusting the blades to reduce the pitch, the amount of power absorbed for propulsion will be decreased and a relatively greater portion of the total power output of the turbine means will be absorbed by the compressor. The arrangement for adjusting the pitch of the propeller blades may obviously be combined with one or more of the means hereinbefore described for varying the back pressure of the exhaust gases or throttling the inlet of the compressor or for discharging compressed air or motive fluid.

In a system in which power for propulsion is delivered only by means of a propeller, the ratio of the power input to the compressor to the power available for propulsion may obviously be varied by adjusting the pitch of the propeller blades and/or by-passing part of the compressed air. The mode of operation in such case is substantially the same as that described in connection with the preceding examples and it is believed requires no further explanation.

In the accompanying drawings forming a part of this specification there is diagrammatically illustrated embodiments of apparatus suitable for carrying the invention into effect, such embodiments being described in the ensuing portion of this specification.

Fig. 1 is a diagrammatic longitudinal central section through a propulsion unit embodying the invention and in which means are provided for varying the back pressure of the exhaust gases of the turbine and for varying the pitch of the propeller;

Fig. 1a illustrates a fuel control applicable to the embodiment shown in Fig. 1;

Fig. 2 is a view similar to Fig. 1 and illustrating an embodiment in which only the rocket effect of the exhaust gases is used for propulsion;

Fig. 2a is a section taken on the line 2a—2a of Fig. 2;

Fig. 3 is a view similar to Fig. 1 showing still another embodiment for rocket propulsion and provided with means for varying the amount of air admitted to the compressor; and Fig. 4 is a view similar to Fig. 1 and illustrating an embodiment in which means are provided for discharging a portion of the compressed air into the atmosphere.

Referring now to Fig. 1, the system illustrated is of simple form consisting of but a single turbine and compressor unit. It will be understood, however, that this is shown by way of example only and that the invention may be embodied in systems which include a plurality of turbines or compressors. In the figure the propulsion unit is enclosed in an outer casing 10 which is advantageously of generally streamlined form. A rotary compressor 12 of the centrifugal type is provided with a rotor carried by shaft 14 mounted in bearings 16 and 18. Air for the compressor is drawn in through the inlets 20 and 22 and is delivered by the compressor into the annular space 24 surrounding a combustion chamber 26 mounted in the casing. The combustion chamber 26 is provided with air inlets 28 and 30 in communication with space 24. Fuel, such for example as oil, is supplied by means of a fuel pump 32 through the fuel supply pipe 34 to the nozzles 36 and 38 which deliver fuel to the combustion chamber. The main or normal control of the amount of fuel supplied is effected through the medium of a valve 40 in the fuel supply line controlled through any suitable linkage 42 under the control of the operator of the system. Pump 32 may be of any desired type and is advantageously of the kind provided with a constant pressure by-pass for maintaining a supply of fuel at constant pressure available at the valve 40, regardless of the position of the valve.

From the combustion chamber 26 in which the air is heated by combustion with the fuel to form hot motive fluid, the motive fluid is admitted to the blade system of the gas turbine 44, the rotor of which is also carried by the shaft 14 which carries the rotor of the compressor. The exhaust gases from the turbine are delivered through the discharge channel 46 having a rearwardly directed outlet opening 48. An end cap 50 carried by the inner part of the turbine outlet 52 is disposed within the channel 46 and the parts are so proportioned that the channel formed between cap 50 and the outer channel wall 54 decreases in cross-sectional area in the direction toward the outlet opening 48, so that exhaust gases, discharged from the turbine at relatively high back pressure and low velocity, will be accelerated so as to leave the outlet 48 at high velocity to produce the desired rocket effect.

In the embodiment illustrated, propulsion is effected in part by the rocket effect of the exhaust gases and in part by means of a propeller 56. The latter is connected to and driven by shaft 14 through reduction gearing indicated generally at 58.

The propeller illustrated is of the variable pitch type, the pitch of the blades being adjustable through the medium of suitable known mechanism indicated generally at 60 and controlled by means of suitable linkage 62 adapted to be operated by the operator of the system.

A portion of the wall 54 of the channel 46 is made in the form of a flap 64 movable about a pivot 66, and through suitable linkage 68 is adapted to be controlled by the operator of the system. If the flap 64 is moved to the open dotted line position indicated at 64', the outlet velocity of the gases leaving the channel 46 and the rocket effect produced thereby obviously will be reduced and the back pressure on the turbine will also be reduced. From this it follows, as previously explained, that the compressor will have delivered to it a larger proportion of the power momentarily produced by the turbine. Even if the fuel supply has not been decreased, the total power utilized for propulsion will be momentarily decreased and the turbine will increase its speed and also that of the propeller as well as that of the compressor. If, on the other hand, the fuel supply is decreased simultaneously with the opening of the flap 64, the speed of the turbine and of the propeller may be kept substantially constant, only the ratio of the power input to the compressor to the power used for propulsion being increased.

For simultaneously effecting a decrease in the fuel supply when the flap 64 is opened, the fuel line 34 may advantageously be provided with an auxiliary fuel control valve 70 (Fig. 1a) interconnected by means of linkage 72 with the linkage 68 controlling flap 64. As will be obvious from this figure, movement of the flap 64 to decrease the rocket effect will simultaneously cause a decrease in the amount of fuel supplied to the combustion chamber, and vice versa.

Instead of, or in addition to the flap 64 at the outlet of the channel 46, a flap valve 74 controlled by a suitable linkage 76 may be arranged adjacent to the turbine outlet 52, this valve when opened operating to permit some of the exhaust gases to be delivered directly to atmosphere through the by-pass conduit 77. Obviously this by-pass conduit will operate to reduce the back pressure of the gases on the turbine and also the rocket effect produced thereby.

The manner in which the distribution of power utilized for propulsion and utilized for driving the compressor is altered by varying the pitch of the propeller blades, which may be effected through the control 62, has already been explained and need not be repeated here.

In the embodiment shown in Fig. 2, propulsion of the aircraft is asumed to be by rocket effect only. In this embodiment the compressor is shown as being of the screw or worm type, comprising rotors 78 and 80 cooperating respectively with rotors 82 and 84 (Fig. 2a). The rotors are connected by means of suitable gearing 86 to the shaft 14 and deliver compressed air to the space 24 surounding the combustion chamber 26. Air is admitted to the compressors through the inlets 88 and 90. Fuel is injected into the combustion chamber through apparatus similar to that shown in Fig. 1.

The exhaust gases from the turbine 44 are normally discharged at high velocity through the outlet opening 48, the cross-section of which is smaller than the cross-section of the turbine outlet 52. By-pass conduits 92 and 94 provided with valves 96 and 98 respectively are connected to the turbine outlet, the outlet opening of the conduit 92 being directed in substantially forward direction and the outlet of the conduit 94 being directed substantially downwardly. A valve 100 is located in the outlet channel 46 and the three valves 96, 98, and 100 are provided with suitable operating controls 102, 104, and 106, respectively.

With the valves in the positions indicated in full lines, the exhaust gases are discharged through the outlet 48 at high velocity to produce the rocket drive. If, however, valve 96 and/or valve 98 are opened, the back pressure of the exhaust gases and the rocket effect produced thereby will be reduced. If valve 100 is closed, all of the gases can be discharged through conduits 92 and/or 94 and due to the disposition of their outlets, a braking and/or lifting effect can be obtained.

Assuming the aggregate being designed to develop 1500 H. P. at the maximum speed of 4000 R. P. M., 840 H. P. being absorbed by the compressor and 660 H. P. being utilized for the propulsion of the aggregate, and the normal inlet temperature of the driving fluid being 700 degrees centigrade (°C.). It is further assumed that the aggregate at the moment in consideration is operated at partial load and develops 880 H. P. of which 500 goes to the compressor and 380 for propulsion, the speed of the turbine and compressor being 3000 R. P. M. and the inlet temperature being about 700° C. If it is now desired to accelerate the aggregate, the cross-sectional area through which the exhaust gases leave the craft is increased, with the result that the back pressure at which the turbine exhausts and the velocity of the gases discharged will be reduced and this will also reduce the propelling power to, for example, 210 H. P. If the total energy developed by the aggregate has not been altered, the compressor will now absorb 670 H. P. The ratio of the power input to the compressor to the power available for propulsion, which under the initial conditions was $500/380=1.32$, will now be increased to $670/210=3.2$, and the compressor will be accelerated to about 4000 R. P. M. and considerably more air will be compressed than the quantity corresponding to the normal ratio between air and fuel, with the result that the inlet temperature of the driving fluid will be reduced to about 450° C. This enables the supply of fuel to be rapidly increased to the maximum value corresponding to a total output of 1500 H. P. without undue rise in temperature, the final temperature rising to about 700° C.

If, in order to maintain the speed of the turbine and compressor substantially constant during the time required for increasing the ratio of the power input to the compressor to the power available for propulsion, the fuel supply is decreased by means of valve 70 (Fig. 1a) simultaneously with the reduction of the back pressure of the exhaust gases, the total amount of energy produced by the system will be reduced to about 650 H. P., 500 H. P. being absorbed by the compressor and 150 H. P. being utilized for propulsion. Also in this instance, the temperature of the driving fluid will be decreased to about 450° C., the compressor producing a quantity of air considerably exceeding the quantity required for maintaining constant the normal inlet temperature. If thereupon the fuel supply is increased, an undue rise of the inlet temperature of the driving fluid will be prevented due to the fact that the compressor at the beginning of the increase of fuel quantity is delivering air in excess.

In the embodiment shown in Fig. 3, the turbine 44 drives a centrifugal compressor 12. As in the embodiment illustrated in Fig. 2, propulsion is obtained entirely by the rocket effect of exhaust gases. The air inlet 108 to the compressor is provided with a valve 110 by means of which the cross-sectional area of the inlet may be varied.

Valve 110 may be operated by any suitable control indicated at 112. The open position of the valve shown in the figure corresponds to normal operation of the system.

A portion of the wall 54 of the outlet channel 46 is made in the form of a flap valve comprising two flaps 114 and 116 connected to each other and movable about a pivot 118, the flap valve being adapted to be controlled by the operator of the system through suitable linkage 120. The area of the flap 114 is larger than the area of the flap 116. The position of the flaps indicated in full lines in the figure corresponds to normal operation of the system.

If the output of the system is to be reduced, for the purpose of landing, from normal load to partial load, the operator of the system reduces the supply of fuel and brings the flap valve 114, 116 into the position 114', 116' indicated by dotted lines. At the same time the valve 110 is adjusted so as to reduce the inlet area of the compressor 12. By moving the flap valve into the position 114', 116' the cross-sectional area of the outlet channel is increased and the back pressure at which the turbine exhausts is decreased. Since the normal outlet opening is closed by the flap 116, all of the exhaust gases will be discharged through the opening normally closed by flap 114 and will thereby produce a certain lifting effect. Due to the reduction of the inlet area of the compressor, the temperature of the driving fluid will be decreased to a smaller degree than in the example described above. If the system is to be accelerated, the fuel supply is increased and the valves 110 and 114, 116 are moved to their normal positions. Due to the increase of the compressor inlet area the compressor will be able rapidly to increase the amount of air so that an undue rise of the temperature of the driving fluid will be prevented. With respect to the variation of the exhaust pressure and the ratio between the compressor input and the propulsion power, the mode of operation is substantially the same as in the previously described embodiments.

In the embodiment shown in Fig. 4, the cross-sectional area of the compressor inlet and of the outlet channel 46 is constant. In this instance, a flap 122 movable about a pivot 124 and operable through suitable linkage 126 is provided in the casing 10 in the passage between the outlet of the compressor 12 and the inlet to the combustion chamber 26. The position of the flap indicated in full lines in the figure corresponds to normal operation of the system.

If before landing the output of the system is to be decreased from full load to partial load, the operator reduces the supply of fuel and opens the flap 122 as indicated at 122' in dotted lines. A portion of the compressed air will then be discharged through the opening in the casing 10. If the system is to be rapidly accelerated, the fuel supply is increased and the flap 122 is closed. The whole amount of air previously discharged through the opening in the casing 10 will now be supplied to the combustion chamber so as to prevent an undue rise of the temperature of the driving fluid.

What I claim is:

1. A propulsion unit for aircraft including gas turbine means comprising a turbine providing propelling power, compressor means including a compressor driven by said turbine and always operating therewith to compress air for use in the motive fluid delivered to said turbine means, combustion chamber means to which the compressed air is supplied and from which motive fluid is delivered to said turbine means, means for supplying fuel to said combustion chamber means to produce said motive fluid, governing means for controlling at will the ratio of the power input to said compressor means to the power available for propulsion, and means for varying the fuel supply to the system independently of the main fuel control when the power ratio is altered by said governing means.

2. A propulsion unit for aircraft including gas turbine means comprising a turbine providing propelling power, compressor means including a compressor driven by said turbine and always operating therewith to compress air for use in the motive fluid delivered to said turbine means, combustion chamber means to which the compressed air is supplied and from which motive fluid is delivered to said turbine means, means for supplying fuel to said combustion chamber means to produce said motive fluid, governing means for controlling at will the ratio of the power input to said compressor means to the power available for propulsion, means providing a main fuel control and means providing an auxiliary fuel control, said auxiliary fuel control operating to reduce the amount of fuel supplied when the power ratio is altered to increase the relative amount of power input to said compressor means and to increase the fuel supply when the normal power ratio is reestablished.

3. In a gas turbine propulsion unit for aircraft, a turbine, a compressor driven by said turbine and always operating therewith, a combustion chamber, means for delivering compressed air from the compressor to the combustion chamber, means for supplying fuel to the combustion chamber, means for supplying motive fluid from the combustion chamber to the turbine, means for directing the exhaust gases from the turbine rearwardly of the aircraft at high velocity to provide rocket propulsion and means for enlarging at will the area of the outlet for said exhaust gases, whereby to reduce their velocity and the rocket propulsion effect and to increase the proportion of the momentarily developed power of the turbine absorbed by said compressor.

4. In a gas turbine propulsion unit for aircraft, a turbine, a compressor driven by said turbine and always operating therewith, a combustion chamber, means for delivering compressed air from the compressor to the combustion chamber, means for supplying fuel to the combustion chamber, means for supplying motive fluid from the combustion chamber to the turbine, means for directing the exhaust gases from the turbine rearwardly of the aircraft at high velocity to provide rocket propulsion and means for decreasing the area of the inlet to the compressor, whereby to decrease the quantity of gases exhausted from the turbine and the rocket effect produced thereby and to cause a larger proportion of the momentarily developed power of the turbine to be absorbed by said compressor.

5. In a gas turbine propulsion unit for aircraft, a turbine, a compressor driven by said turbine and always operating therewith, a combustion chamber, means for delivering compressed air from the compressor to the combustion chamber, means for supplying fuel to the combustion chamber, means for supplying motive fluid from the combustion chamber to the turbine, means for directing the exhaust gases from the turbine rearwardly of the aircraft at high velocity to provide rocket propulsion and means for increasing the proportion of the momentarily developed power of the turbine absorbed by the compressor comprising means for reducing the rocket effect of a given quantity of exhaust gas delivered from the turbine and means for decreasing the amount of air compressed to decrease the quantity of exhaust gas produced per unit time by the turbine.

6. In the operation of an aircraft propulsion unit of the gas turbine type having a turbine driving its own compressor to provide air for motive fluid, and providing additional power for propulsion of the aircraft, the improved method of increasing the effective propelling power of the unit which includes the steps of temporarily altering the proportion of the momentarily available power to supply a greater proportion thereof for driving the compressor and a lesser proportion thereof for propulsion of the aircraft whereby to temporarily increase the amount of air compressed by the then available power, supplying an increased amount of fuel to the augmented air supply to provide a substantially increased amount of motive fluid and thereafter reestablishing the normal ratio between the power delivered to the compressor and the power available for propulsion.

7. In the operation of an aircraft propulsion unit of the gas turbine type having a turbine driving its own compressor to provide air for motive fluid, and providing additional power for propulsion of the aircraft, the improved method of increasing the effective propelling power of the unit which includes the steps of temporarily lowering the back pressure against which the turbine exhausts to increase pressure drop through the turbine and thereby increase the power momentarily delivered by the turbine, utilizing the increased power delivered to increase the amount of air compressed, supplying an increased amount of fuel to the augmented air supply to provide an increased amount of motive fluid and thereafter reestablishing the normal ratio between the power delivered to the compressor and the power available for propulsion.

8. In the operation of an aircraft propulsion unit of the gas turbine type having a turbine delivering exhaust gas reactively to provide rocket propulsion and driving its own compressor to provide compressed air for motive fluid, the improved method of increasing the effective propelling power of the unit which includes the steps of momentarily altering the delivery of the exhaust gases to decrease the propelling effect thereof and to increase the proportion of the momentarily developed power delivered to the compressor, whereby to obtain an increased supply of compressed air for motive fluid, increasing the quantity of fuel supplied to the augmented air supply to increase the amount of motive fluid delivered to the turbine and thereafter reestablishing the normal ratio between the power delivered to the compressor and the power utilized for propulsion.

9. In the operation of an aircraft propulsion unit of the gas turbine type having a turbine delivering exhaust gas reactively to provide rocket propulsion and driving its own compressor to provide compressed air for motive fluid, the improved method of increasing the effective propelling power of the unit which includes the steps of decreasing the exit velocity of the exhaust gases by increasing the area of the outlet therefor, whereby to decrease the propelling effect thereof and to increase the proportion of the monetarily available power delivered to the compressor, increasing the amount of fuel delivered to the augmented air supply resulting from the increased power delivered to the compressor to obtain an increased supply of motive fluid and thereafter reestablishing the normal ratio between the power delivered to the compressor and the power utilized for propulsion by decreasing the area of the outlet for the exhaust gases and thereby increasing their exit velocity.

10. In the operation of an aircraft propulsion unit of the gas turbine type having a turbine delivering exhaust gas reactively to provide rocket propulsion and driving its own compressor to provide compressed air for motive fluid, the improved method of increasing the effective propelling power of the unit which includes the steps of decreasing the amount of air admitted to the compressor and decreasing the exit velocity of the exhaust gases by increasing the area of the outlet therefor, whereby to decrease the amount of motive fluid delivered to the turbine and to decrease the propelling effect of the exhaust gases and to decrease the proportion of the momentarily available power utilized for propulsion and to increase the proportion thereof delivered to the compressor, increasing the amount of fuel supplied to increase the total power developed by the turbine and thereafter reestablishing the normal ratio of power distribution by increasing the area for admission of air to the compressor and decreasing the area of the outlet for the exhaust gases and thereby increasing their exit velocity.

11. A propulsion unit for aircraft including gas turbine means comprising a turbine providing reaction propulsion from the exhaust gases of the turbine, compressor means including a compressor driven by said turbine and always operating therewith to compress air for use in the motive fluid delivered to said turbine means, combustion chamber means to which the compressed air is supplied and from which motive fluid is delivered to said turbine means, means for supplying power to said combustion chamber means to produce said motive fluid and means for reducing the reactive propelling effect of said exhaust gases comprising a by-pass conduit having a laterally directed outlet and a valve for controlling the flow of exhaust gases through said by-pass conduit.

12. In a gas turbine propulsion unit for aircraft, a turbine, a compressor driven by said turbine and always operating therewith, a combustion chamber, means for delivering compressed air from the compressor to the combustion chamber, means for supplying fuel to the combustion chamber, means for supplying motive fluid from the combustion chamber to the turbine, and means for discharging a portion of the compressed air before entering the combustion chamber, whereby to reduce the amount of motive fluid supplied to the turbine and to increase the ratio of the power input to the compressor to the power available for propulsion.

ALF LYSHOLM.